July 12, 1966  A. R. BERGANTINI  3,260,438
APPARATUS FOR THE PRODUCTION OF BEAM, GIRDERS, OR THE LIKE
Filed Feb. 4, 1963  3 Sheets-Sheet 3
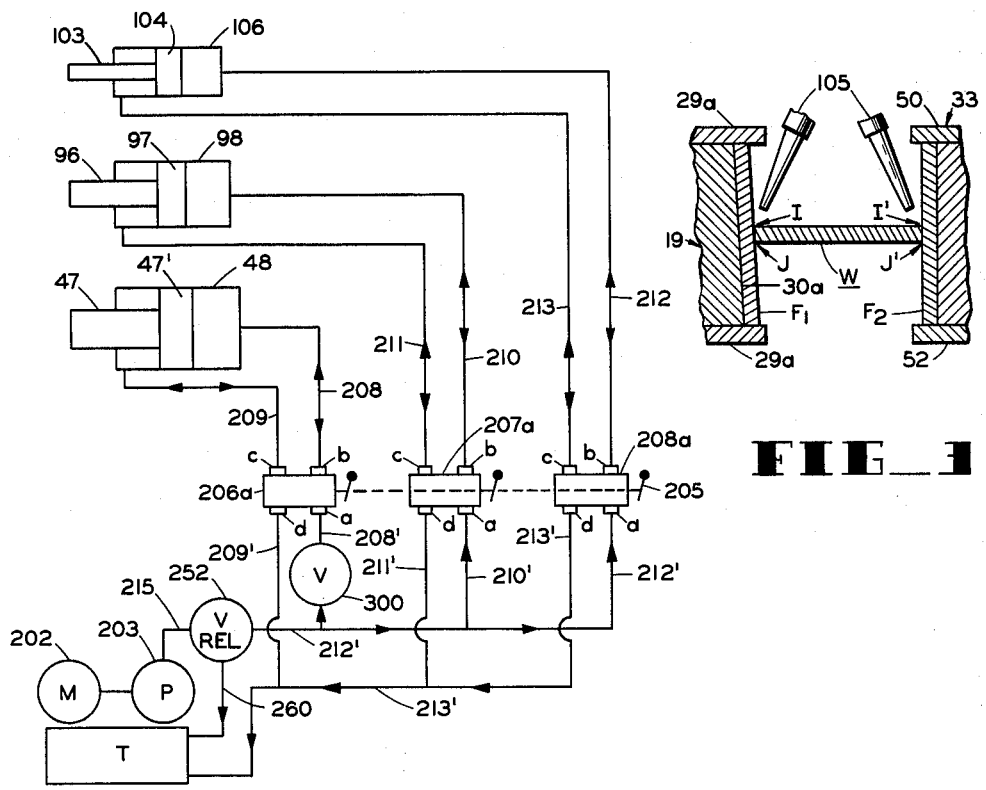
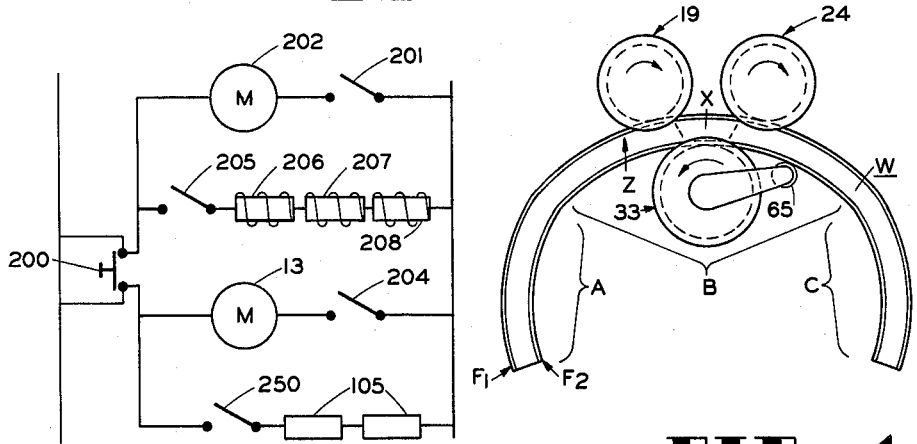
INVENTOR.
ATTILIO R. BERGANTINI
BY James E. Cooney though two such recesess 9 are used, only one

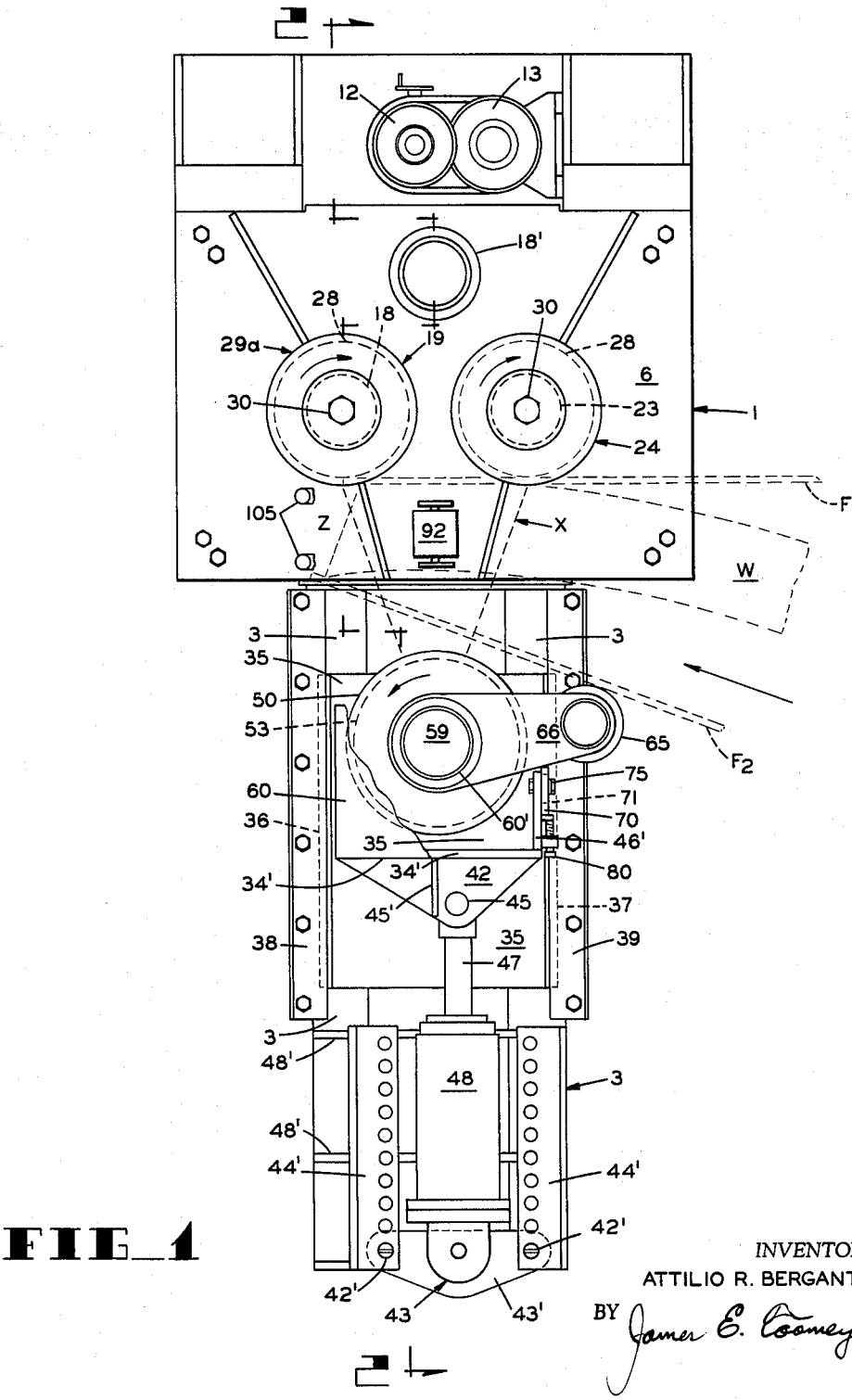
FIG_1
INVENTOR.
ATTILIO R. BERGANTINI

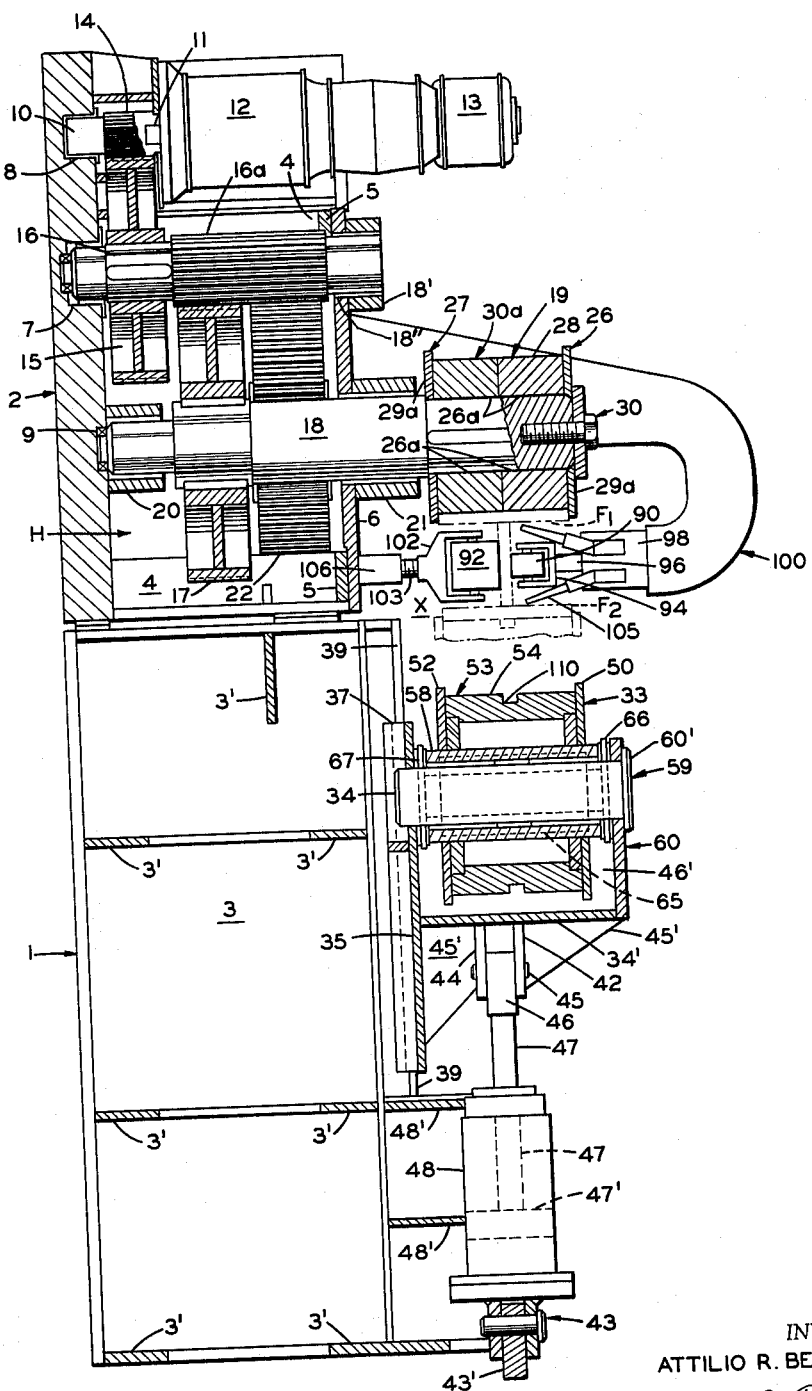
FIG_2

United States Patent Office 3,260,438
Patented July 12, 1966

3,260,438
APPARATUS FOR THE PRODUCTION OF BEAMS, GIRDERS, OR THE LIKE
Attilio R. Bergantini, Napa, Calif., assignor to Kaiser Steel Corporation, Oakland, Calif., a corporation of Nevada
Filed Feb. 4, 1963, Ser. No. 255,992
8 Claims. (Cl. 228—6)

This invention relates to a method and apparatus for fabricating structural members. More particularly, it is concerned with a novel apparatus for clamping and welding together the various components of a beam, girder or the like wherein the various components making up a beam or girder are drawn toward one another, clamped together and then passed in a clamped-together relationship through a welding zone to effect a welding of the components together.

Accordingly, it is the primary purpose of the instant invention to provide a novel apparatus for drawing and clamping together in a predetermined fashion the various components making up a beam, girder or the like and then passing these clamped-together components through a welding zone to effect a welding of the components together.

Other purposes and advantages of the instant invention will become more apparent from a review of the following detailed description when considered in conjunction with the appended drawings, wherein FIG. 1 is a top plan view of one suitable apparatus that can be used in practicing the instant invention and with the various components making up the beam or girder to be clamped together and welded being shown in dotted lines and with parts broken away and with other parts removed for the sake of clarity;

FIG. 2 is an elevational sectional view of the apparatus shown in FIG. 1, when taken generally along line 2—2 thereof being rotated 90° clockwise and with parts added and with other parts being shown in outline and with other parts being broken;

FIG. 3 is a sectional view of certain modified clamping roller elements which can be used with the apparatus shown in FIGS. 1 and 2;

FIG. 4 is a partial schematic plan view of the apparatus shown in FIGS. 1 and 2 and discloses in a schematic fashion one type of beam which can be advantageously fabricated by the apparatus and method of the instant invention;

FIG. 5 is a schematic view of a suitable hydraulic system which can be employed for actuating certain of the elements of the apparatus shown in FIGS. 1 and 2; and FIG. 6 is a schematic view of a suitable electrical control system which can be used to operate certain of the elements of the apparatus shown in FIGS. 1 and 2.

With further reference to the drawings, and in particular FIGS. 1 and 2, one suitable type of apparatus which may be used in practicing the instant invention is generally comprised of a support means 1 mounted upon the floor of the factory or building housing the apparatus. Support means 1 includes a base plate 2 and a plurality of upstanding beams 3 located to one side of and suitably joined to the base plate 2. Beams 3 are generally located in spaced parallel relationship to each other and conventional bridging elements 3' act to join the beams together. Affixed to the base plate 2 is a series of conventional upstanding frame and bracket members 4 and 5, respectively, which support an upper plate member or platform 6 in spaced relationship to the main base plate 2. Platform 6 and plate 2 in effect form a housing H therebetween. Located in the base plate 2 is a series of recesses or wells 7, 8 and 9. Al is shown in the drawings. Journalled in recess 8 is the stub end of a driveshaft 10. Driveshaft 10 is connected to the shaft 11 which protrudes from a conventional gear reduction device 12. The gears, etc., of the gear reduction device and shafts 11 and 10 are ultimately driven in a conventional fashion by an electric motor 13. Driveshaft 10 is provided with a gear portion 14 which meshes with a large drive or bull gear 15 affixed to the lower end of upright shaft 16. One end of shaft 16 is journalled in the bearing well 7 in plate 2 while the other end is journalled in the opening 18'' in the plate 6 and the annular bearing member 18' affixed to plate 6. The intermediate section of shaft 16 is grooved so as to be provided with an elongated gear portion or segment 16a. The lower extremity of the gear segment 16a is adapted to mesh with a gear 17 affixed to the upright shaft 18 for the clamping roller 19. The lower extremity of shaft 18 is suitably journalled in the bearing recess 9 in the base plate 2. The shaft 18 is held firmly in place on plate 2 by means of the journal support and holder 20 fixedly secured to the base plate 2.

The top extremity of shaft 18 is disposed in the journal support means 21 fixedly secured to the upper top plate 6. A similar arrangement is used for mounting shaft 23 to which the clamping roller 24 is attached. Clamping rollers 19 and 24 make up a line of rollers or a clamping roll means disposed on one side of the support means 1 with the axis of shafts 18 and 23 being aligned.

The upper portion of the gear segment 16a of shaft 16 is adapted to mesh with a gear 22 disposed on the shaft 23 for clamping roller 24 at the same time the lower portion of the gear segment 16a meshes with the gear 17 on shaft 18.

From the above description, it is believed obvious that operation of shaft 10 by the motor 13 and the gear train, etc., in gear reduction device 12 will cause a rotation of the several clamping rollers 19 and 24 in the proper direction.

An advantageous embodiment of the invention contemplates that the peripheral portions of rollers 19 and 24 be hollowed out such that they are provided with top and bottom shoulder or flange portions 26 and 27, whereby peripheral pockets or recesses 28 are formed on the outer peripheries of the rollers. These pockets or recesses 28 in turn are adapted to slidingly recieve the edges of a structural component, such as a flange $F_1$ of the structural member or beam being formed and welded by the method and apparatus of the invention.

Since it is contemplated that structural members having parts such as flnages of varying widths would be fabricated by use of the method and apparatus of the instant invention, rollers of different sizes and flanged portions would be employed and for this reason the rollers 19 and 24 are removably fastened to their respective shafts by bolt and washer means 30.

As an alternative to using flanged rollers of different sizes, a further embodiment of the invention contemplates that the upper and top portions of each such roller may have, as indicated in FIG. 2 of the drawings, removable washer-like elements 29a affixed thereto so as to form the aforesaid flanges and recesses in these rollers, while the main body of the rollers is made up of removable ring-like segments 26a which fit about the spindles or shafts 18 and 23, these washer elements and ring-like segments 26a being held in place by means of the bolt and washer means 30.

In this way, the size of the final opening or channel 30a formed by the outside peripheries of the roller segments 26a can be readily adjusted to accommodate flange elements of varying widths on the beam being fabricated without the necessity of making complete roller changes or of having a large inventory of rollers. Disposed on support means 1 in spaced and opposed relationship with respect to the clamping rollers 19 and 24 is a clamping and pressure-exerting roller 33. Roller 33 is affixed to a main spindle 59, the lower part of which is seated in the opening 34 of the movable sled or platform 35. The inwardly turned U-shaped side edges 36 and 37 of platform 35 overlap and slide upon the rail members 38 and 39 affixed to the upright base beams 3.

Projecting outwardly from the rearward portion of an upright plate 34' affixed to platform 35 is a plurality of spaced brackets 42 and 44. A pin member 45 is disposed between these bracket members 42 and 44 and this pin member serves to anchor the apertured end 46 of a piston rod 47 to the plate 34'. Piston 47' affixed to the other end of piston rod 47 is mounted within a cylinder 48 adjustably disposed upon the somewhat U-shaped saddle brackets 48' affixed to and disposed between the beam members 3.

The free end of cylinder 48 is provided with an apertured clevis and pin means 43 for removably fixing the cylinder 48 to the cross bar 43'. The opposite ends of bar 43' are removably secured to the apertured bracket members 44' which are fixed to the several spaced beams 3. By use of the apertured members 44' and suitable locking pins 42' which fit in the ends of bar 43' and the members 44', the position of bar 43' and in turn cylinder 48 can be adjusted on the beams 3. Brackets 42 and 44 are reinforced by the gusset members 45'. Mounted upon and supported by end plate 34' and side plates 46' is a top plate 60. Plates 34', 46' and 60 and platform 35 form in effect a housing for roller 33 with the flanged spindle 59 for roller 33 being anchored at one end in an opening in platform 35 and at the other end in an opening in plate 60. The flange 60' of spindle 59 engages plate 60 and holds the spindle from slipping through the openings in platform 35 and plate 60.

The mobility of roller 33 and its interdigited disposition with respect to rollers 19 and 24 is such that a combination passageway and clamping zone X of variable width is provided between the roller 33 and the line of rollers 19 and 24. It is through this passageway, or opening X, that the members to be joined together are passed substantially immediately prior to their entrance into welding zone Z in a clamped condition, all of which will be described more fully hereinafter. It is also in this same passageway that the members making up the components of a beam or other structural member are forced together in a true clamped relationship substantially immediately prior to their entrance into the welding zone, these members being directed to the combination passageway and clamping zone X from a plurality of directions. In top plan, as indicated in dotted lines in FIG. 1, this passageway and clamping zone simulate a V or triangle with the corners of the triangle being located at the peripheries of the various rollers 19, 24 and 33.

In the further advantageous embodiment of the invention, and as particularly indicated in FIG. 2, the clamping roller 33 can be so formed as to be provided with flanged portions 50 and 52 at the top and bottom thereof. These flanged portions or ends of the roller in one advantageous embodiment of the invention can be securely welded to an annular ring 53 to form a complete roller. However, as indicated previously in the case of rollers 19 and 24, it is also contemplated that roller 33 can be so fabricated whereby the ring 53 would be made up of segments and the ends thereof made up of washer-like elements such that the component-engaging portions 53 of roller 33 can be increased or decreased in an easy fashion to accommodate beam components of varying sizes. As indicated in FIG. 2, the flange portions 50 and 52 are of greater radius than the intermediate portion 53 of the roller, such that a pocket or recess 54 is formed therebetween for receiving the edges of a beam component, such as the top and bottom edges of a beam flange $F_2$. It will be further noted by reference to FIG. 2 that roller 33 includes a hollow axle 58 through which the pin member 59 is inserted.

In a further advantageous embodiment of the invention, it is contemplated that a preforming or prebending roller 65 may also be employed. This prebending roller is journalled between a pair of arms 66 and 67, which in turn are affixed to the main shaft or pin 59 adjacent each end of axle 58. Arms 66 and 67 project outwardly from the housing for roller 33 in such a fashion that they hold the roller 65 outside of the housing and in the path of travel of one of the structural components, such as flange $F_2$, being directed to the apparatus by hand or by suitable conveyor means (not shown). This particular roller 65 is used to effect a predetermined bending or flexing of one of the components, such as component or flange $F_2$, in an arcuate path prior to its introduction into the clamping zone Z to facilitate the clamping together of flange $F_2$ with the curved web W of a beam being fabricated.

A bearing plate 70 provided with an elongated slot 71 is adjustably affixed to the side plate 46' of the housing for roller 33 by means of a bolt 75 which passes through the elongated slot 71. It is to be understood that plate 46' is of such a width as not to interfere with the movement of roller 65. Bearing plate 70 is adapted to press against the arms 66 and 67 and to back up the roller 65 as the platform 35 is moved forward and roller 33 is pushed towards rollers 19 and 24. Adjusting screws means 80 rigidly affixed to platform 35 bears against the bearing plate 70. Screw means 80 is used to adjust and hold the bearing plate 70 at a predetermined point on platform 35 whereby it can properly back up roller 65 when the latter is brought into contact with a beam component $F_2$. It will be obvious, in view of the above description, that the movement of the main clamping roller 33 toward and its clamping position in clamping zone X is controlled by the operation of the piston 47' within the cylinder 48. The movement of piston 47', together with bearing plate 70, also controls the entry angle of beam component $F_2$ into the clamping zone X and the amount of flexing or prebending of beam component $F_2$.

It is contemplated that one type of structural element which can be readily fabricated by use of the instant method and apparatus is one which has an arcuate configuration, such as a beam used in the construction of tunnels and which are referred to in the trade as "tunnel ribs." In this case, the web W would be preformed so that it has an arcuate configuration along its length and thereafter the flanges $F_1$ and $F_2$ would be secured or welded to opposing sides of the web W so as to form a beam which is roughly H-shaped in cross section and arcuate or curved along its length.

For the purpose of aligning the various components of such a beam together, the flanged roller 33 is moved toward rollers 19 and 24 until it reaches the position shown in phantom in FIG. 2 and such that the edges of the flanges $F_2$ and $F_1$ are respectively slidably received in the pocket or recess 54 of roller 33 and pockets 28 of the rollers 19 and 24. If desired, the extreme leading edges of flanges $F_1$ and $F_2$ and web W can be previously tack-welded to each other prior to their introduction into the apparatus of FIGS. 1 and 2 so as to facilitate the latter clamping together and final welding of the remaining portions of the beam. With the roller 33 disposed in its predetermined forward clamping position and roller 65 in a predetermined bending position by virtue of the movement of piston 47' in cylinder 48, flanges $F_1$ and $F_2$ are pressed and clamped against opposing sides of the web W by the pressure exerted by roller 33 upon the assembled components W, $F_1$ and $F_2$ as these components are forced against back-up rollers 19 and 24. In other words, as the flanges $F_1$ and $F_2$ and web W converge upon one another from a plurality of directions as they approach the clamping zone X, they are first forced together by clamping action of the clamping rollers 33, 19 and 24 and then held or retained in this clamped condition as they exit from zone X and until they completely pass through the welding zone Z located closely adjacent clamping zone X. It is also contemplated that the web W would be held in a proper position and properly aligned with the various flanges $F_1$ and $F_2$ through the medium of upper and lower support or guide rolls 90 and 92. Roller 90 is journalled on a clevis pin 94 affixed to the rod end of a piston rod 96 secured to the piston 97 mounted in cylinder 98. Cylinder 98 is dependingly suspended over the clamping zone X by means of the suspension bracket 100 suitably secured to top plate 6. The lower supporting roll 92 for the web W is anchored in the clevis member 102 threadedly affixed for adjustment purposes to the rod end of a piston rod 103 secured to piston 104 mounted in a cylinder 106. Cylinder 106 also is supported on and projects upwardly from the base member 6. Fixedly disposed within the welding zone Z which in turn is preferably located substantially immediately adjacent the exit end of passageway X is a pair of welding head units 105. As noted in the drawings, these units 105 are also located rearwardly of or in offset relationship with respect to clamping rollers 19 and 33. The welding head units can be conventional submerged arc welding units. A welding unit which has been found acceptable is one manufactured and sold by the Lincoln Electric Company of Cleveland, Ohio, namely, model LAF4–AC. Two such units can be connected in tandem so as to deposit filler metal at the points of intersection I and I' of the beam components or web W and flanges $F_1$ and $F_2$. By locating the welding zone Z close to and preferably substantially immediately adjacent to the clamping zone and passageway X, the various beam components will be effectively held together in bearing contact with each other and in a full clamped-together relationship for a sufficient period of time and travel distance to permit the proper continuous deposition of molten filler weld material in the weld areas adjacent joint areas or points of the intersections I and I' of the beam components and the proper solidification of the filler weld materials whereby sound welds will be made along the entire length of the beam being fabricated. Thus, the clamping action of the various rollers with respect to the structural components is effective not only within zone X but also in zone Z and slightly beyond zone Z. After one side of a beam is completely welded, the beam is inverted and again passed through the apparatus so as to deposit molten filler web material on the other side of the beam adjacent the intersections J and $J_1$ of the several components.

The uniform pressure exerted on the components W, $F_1$ and $F_2$ by the roller 33 as it tries to seat itself between rollers 19 and 24 in response to continuous uniform pressure exerted on roller 33 by the piston 47 is also continuous despite any curvature of web W. Thus, roller 33 can be said to float constantly and accurately follow the configuration of the components being welded together. By virtue of the floating movement of roller 33, roller 33 will always tend to maintain contact with the beam components and force them together against the back-up rollers 19 and 24 regardless of the configuration of the components. The pressure exerted by roller 33 is also such that although it is sufficient to effect a firm clamping of the beam components together, it is not so great as to bind the components between the rollers 19, 24 and 33, whereby the components will be prevented from properly sliding past the rollers 19, 24 and 33 under the driving action of rollers 19 and 24. In the case of where a curved beam is fabricated, roller 33 also applies a bending force on flange $F_2$, and thus actually bends flange $F_2$ into position against the curved web W at the same time it clamps the various beam components together. In the case of where an arcuate beam is fabricated, the beam made up of the various components W, $F_1$ and $F_2$ will traverse an arcuate path as it successively passes through clamping zone X and welding zone Z.

In a further advantageous embodiment of the invention it is contemplated, as indicated in FIG. 4, that a curved beam, portions of which have different radii, may also be manufactured by the method and apparatus of the instant invention. In this instance, for example, as indicated schematically in FIG. 4, the forward portion A of an H-shaped beam would have one particular radius, such as fifteen feet, while the intermediate portion B of the beam would have a larger radius, such as twenty feet, and the final portion C of the beam would have a radius similar to the first portion A of the beam. The ability to manufacture a continuous beam having different radii is extremely advantageous in that it permits fabrication of the beam in substantially one operation and while using the same equipment. All that would be required in this instance would be first to properly adjust the roller 33 with respect to the other rollers 19 and 24 and thereafter proper operation of the fluid system used to motivate piston 47' in cylinder 48.

A further advantageous embodiment of the invention is disclosed in FIG. 3. By referring to FIG. 3, it will be observed that the angles at which the various structural components making up a beam can be disposed and welded with respect to one another can be varied depending upon the results desired. In other words, instead of having the flanges $F_1$ and $F_2$ located at a 90° angle with respect to the web W, one or more of the flanges $F_1$ and $F_3$ can be disposed at a different angle simply by using rollers 19 and 24 or 33 which have a conical configuration. It is to be understood, of course, that suitable supporting and feed rolls, not shown, can, if desired, be employed for directing the various components toward the beam welder machine in a manner conventional in the art.

The speeds with which articles are welded by the method and apparatus of the instant invention will vary depending upon the particular article being fabricated. Moreover, although the drawings illustrate the use of the instant method and apparatus in the welding of an H-shaped beam, curved along its length, curved T-shaped and I-shaped beams and other shaped beams may also be advantageously welded by means of the apparatus and method disclosed herein, as well as straight H-shaped, T-shaped and I-shaped beams or even tapered beams, i.e., beams wherein the web W has a tapered width along its length. In the case of where a T-shaped beam is being welded, a portion of roller 33 can be so constructed that it is provided with a pocket or recess 110 within which the stem of the T would be slidingly received during the clamping operation. The means for operating and synchronizing the movements of the various parts of the apparatus will now be described, reference being made particularly to FIGS. 5 and 6 of the drawings.

In initial operation of the apparatus, a suitable master switch 200 is closed, thereby placing the electrical circuit in a condition for full energization. The switch 201 in the line leading to the motor 202 which drives the pump 203 is next closed, thereby causing energization of the motor 202 and the pump 203. The switch 204 is then closed in the line leading to the mill motor 13 used to drive the various clamping rolls 19 and 24. Next, the switch 205 is closed in the line for the solenoids 206, 207 and 208. Solenoid 206 controls the valve 206a in the lines 208, 208', 209 and 209' leading to the main pressure cylinder 48, while solenoid 207 controls valve 207a located in the lines 210, 210', 211 and 211' leading to the cylinder 98 for the top web-clamping roll 90, while solenoid 208 controls valve 208a in lines 212, 212', 213 and 213' leading to the cylinder 106 controlling the lower web-clamping roll 92. Although it is not shown in the drawings, cylinder 106 is purposely made somewhat larger than cylinder 98 so as to enable roller 92 to exceed the clamping force of roller 90. The closing of switch 205 simultaneously energizes all of the solenoids 206, 207 and 208 and upon energization of the solenoids the folling action takes place. Solenoid 206 controls the valve spool in valve 206a in such a fashion that the fluid passes from main line 215 into lines 212' and 208' through port a and out of port b of valve 206a, then through line 208 and into the right-hand side of cylinder 48, as viewed in the drawings, with fluid being simultaneously evacuated from the left-hand side of cylinder 48 through lines 209, 209' and ports c and d of valve 206a and line 213' back to the tank T. At the same time, fluid passes through line 215 and lines 212' and 210' through port a of valve 207a and out through port b thereof and into line 210 and thence to the right-hand side, as viewed in the drawings, of the cylinder 98. At the same time, fluid is evacuated from the left-hand side of cylinder 98 through line 211 and then into port c and out through port d of valve 207a and into lines 211' and 213' back to the tank T. Finally, fluid for the cylinder 106 is passed from lines 215 and 212' through ports a and b of valve 208a into lines 212 and into the right-hand side of the cylinder 106, while at the same time fluid is evacuated from the left-hand side of cylinder 106 through line 213, ports c and d of valve 208a and then through line 213' back to the tank T. When all of the clamping and guide rolls are placed in their proper condition with respect to the article being fabricated and each other, the welding units 105 are then energized by depression of the switch 250. Included in the circuit for cylinder 48 is a line pressure regulating valve 300, the purpose of which is to control at all times the pressure upon piston 47' and thus insure that the roller 33 will always exert the proper predetermined uniform clamping pressure upon the beam components being clamped together.

If at any time it is desirable to stop the operation completely, the master switch 200 is opened and the entire circuit de-energized so that all of the equipment is fully deactivated. Any particular piece of apparatus can be individually deactivated simply by opening the particular switch controlling the same. To prevent overloading of the fluid circuits and the various cylinders 106, 98 and 48, a pressure relief valve 252 is placed in line 215. When the pressure reaches a predetermined amount, this valve opens and causes the excess fluid to pass out through the valve into line 260 connected directly to tank T.

It is to be further observed that upon the opening of switch 205 solenoids 206, 207 and 208 will be deactivated and the spools in the various four-way valves 206a, 207a and 208a will be so operated whereby the various parts a and c of each valve will be interconnected and the parts b and d interconnected. When this is done and the operation of motor 202 and pump 203 is continued, the several pistons 47', 97 and 104 will be caused to recede back into their respective cylinders.

Advantageous embodiments of the invention have been disclosed and described. It is obvious that various changes and modifications may be made therein without departing from the spirit and scope thereof, as defined in the appended claims, wherein what is claimed is:

1. In an apparatus for welding structural components, the combination of a support means, clamping roll means disposed on one side of said support means and another clamping roll means movably mounted on the opposing side of said support means in spaced relationship to said first-mentioned roll means with the axis of the second mentioned roll means being offset relative to the axis of said first mentioned roll means in such a fashion as to define a clamping zone of variable width between said first- and second-mentioned roll means, each of said roll means being provided with means for receiving and slidably supporting in clamped-together relationship at least a pair of structural components arranged at a predetermined angle with respect to each other, and at least one of said roll means being provided with pocket means for receiving and slidably supporting one of said components, welding head means disposed adjacent the exit end of said clamping zone and in offset relationship with respect to both of said clamping roll means, means for moving said movable roll means towards said other roll means so as to force said components into a clamped-together relationship with each other and means for rotating one of said roll means so as to drive the components in the clamped-together relationship through said clamping zone and then past said welding head means.

2. In an apparatus for welding structural components together to form a beam and the like, the combination of a support means, a first clamping roll means comprised of a pair of rollers disposed on one side of said support means and a second clamping roll means comprised of a roller, the axis of said last-mentioned roller being offset with respect to the axis of each of said rollers of said pair of rollers, said last-mentioned roller also being movably mounted on the other side of said support means in spaced relationship to said first-mentioned roll means and in such a fashion as to define a passageway of variable width between said first and second roll means, each of said rollers being provided with means for slidably receiving and supporting the edges of at least a pair of structural components arranged in a clamped-together relationship and at a predetermined angle with respect to one another, at least one welding head means disposed substantially immediately adjacent the exit end of said passageway and means for moving said movable roller toward the said pair of rollers and into bearing contact with one of said components so as to force and hold said components in a clamped-together relationship between the pair of rollers and said movable roller, and means for rotating at least one of the rollers in said pair of rollers so as to drive the components through said passageway and past said welding head means so as to effect a weld between said components at a point of intersection thereof.

3. An apparatus for welding structural components as set forth in claim 2 including an adjustable bending roller disposed adjacent the entry end of said passageway for engaging and bending one of said components prior to the engagement of said last-mentioned component by one of said clamping rollers.

4. In an apparatus for fabricating beams and the like the combination of a support means, a first clamping roll means comprised of a line of rollers disposed in fixed positions on one side of said support means, a second clamping roll means movably mounted on the other side of said support means in spaced and interdigited relationship to the rollers of said first clamping roll means, said second roll means also being mounted with respect to said first roll means in such a fashion as to define a clamping passageway of variable width between said first and second clamping roll means, each of said roll means being provided with pocket means for receiving and slidably supporting in clamped-together relationship at least a pair of structural components arranged at a predetermined angle with respect to each other, at least one welding head means disposed adjacent the exit end of said passageway, means for moving said movable clamping roll means towards the line of rollers of said first clamping roll means and into bearing contact with one of said components so as to force and hold said components together in a clamped relationship between the said first- and second-mentioned clamping roll means, means for driving the rolls of said first-mentioned clamping roll means whereby said components will be forced completely through said clamping passageway and past said welding head means so as to effect a weld between said components, guide roll means, the axis of which is disposed at an angle to the axis of said first and second clamping roll means for engaging one of said structural components and aligning said one of said structural components with another of said structural components during movement of the clamped-together components through the said passageway.

5. An apparatus as set forth in claim 4 including an adjustable bending roll means disposed adjacent the entry end of said passageway for engaging and bending one of the structural components prior to the engagement thereof by one of said clamping roll means.

6. In an apparatus for welding structural components, the combination of a support means, clamping roll means disposed on one side of said support means and another clamping roll means movably mounted on the opposing side of said support means in spaced relationship to said first-mentioned roll means and in such a fashion as to define a clamping zone of variable width between said first- and second-mentioned roll means, each of said roll means being provided with means for receiving and slidably supporting in clamped-together relationship at least a pair of structural components arranged at a predetermined angle with respect to each other, welding head means disposed adjacent the exit end of said clamping zone and in offset relationship with respect to both of said clamping roll means, means for moving said movable roll means towards said other roll means so as to force said components into a clamped-together relationship with each other, means for rotating one of said roll means so as to drive the components in the clamped-together relationship through said clamping zone and then past said welding head means and said first- and second-mentioned clamping roll means being so arranged with respect to each other as to define a generally triangular passageway of variable dimensions therebetween.

7. In an apparatus for welding structural components, the combination of a support means, clamping roll means disposed on one side of said support means and another clamping roll means movably mounted on the opposing side of said support means in spaced relationship to said first-mentioned roll means and in such a fashion as to define a clamping zone of variable width between said first- and second-mentioned roll means, each of said roll means being provided with means for receiving and slidably supporting in clamped-together relationship at least a pair of structural components arranged at a predetermined angle with respect to each other, welding head means disposed adjacent the exit end of said clamping zone and in offset relationship with respect to both of said clamping roll means, means for moving said movable roll means towards said other roll means so as to force said components into a clamped-together relationship with each other, means for rotating one of said roll means so as to drive the components in the clamped-together relationship through said clamping zone and then past said welding head means and an adjustable bending roller disposed adjacent the entry side of said passageway for engaging and bending one of the components prior to the engagement of said last mentioned component by one of the said clamping roll means.

8. In an apparatus for welding structural components, the combination of a support means, clamping roll means disposed on one side of said support means and another clamping roll means movably mounted on the opposing side of said support means in spaced relationship to said first-mentioned roll means with the axis of the second mentioned roll means being offset relative to the axis of said first mentioned roll means in such a fashion as to define a clamping zone of variable width between said first- and second-mentioned roll means, each of said roll means being provided with means for receiving and slidably supporting in clamped-together relationship at least a pair of structural components arranged at a predetermined angle with respect to each other, welding head means disposed adjacent the exit end of said clamping zone and in offset relationship with respect to both of said clamping roll means, means for moving said movable roll means towards said other roll means so as to force said components into a clamped-together relationship with each other, means for rotating one of said roll means so as to drive the components in the clamped-together relationship through said clamping zone and then past said welding head means and at least one of said roll means comprising a roller formed from a plurality of ring-like segments and flange elements removably affixed to a roller spindle.

References Cited by the Examiner

UNITED STATES PATENTS

| | | | |
|---|---|---|---|
| 1,632,524 | 6/1927 | Weisman | 29—475 |
| 1,797,795 | 3/1931 | Ruhr | 113—131 |
| 1,831,343 | 11/1931 | Caldwell | 113—131 |
| 2,179,802 | 11/1939 | Sykes | 219—102 |
| 2,282,537 | 5/1942 | Whitney | 29—475 |
| 2,845,038 | 7/1958 | Crawford | 113—131 |
| 3,164,713 | 1/1964 | Banks et al. | 113—113 |
| 3,171,375 | 3/1965 | Linnander | 113—131 |

WHITMORE A. WILTZ, *Primary Examiner.*

CHARLES W. LANHAM, JOHN F. CAMPBELL,
*Examiners.*

M. L. FAIGUS, C. I. SHERMAN, *Assistant Examiners.*